US010140272B2

(12) United States Patent
Bao et al.

(10) Patent No.: US 10,140,272 B2
(45) Date of Patent: Nov. 27, 2018

(54) DYNAMIC CONTEXT AWARE ABBREVIATION DETECTION AND ANNOTATION

(71) Applicant: International Business Machines Corporation, Armonk, NY (US)

(72) Inventors: Shenghua Bao, San Jose, CA (US); Neil S. Bhargava, Austin, TX (US); Richard L. Martin, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 14/866,053

(22) Filed: Sep. 25, 2015

(65) Prior Publication Data

US 2017/0091164 A1    Mar. 30, 2017

(51) Int. Cl.
G07F 17/30 (2006.01)
G06F 17/24 (2006.01)
G06F 17/27 (2006.01)

(52) U.S. Cl.
CPC .......... *G06F 17/241* (2013.01); *G06F 17/277* (2013.01); *G06F 17/278* (2013.01); *G06F 17/2795* (2013.01)

(58) Field of Classification Search
CPC ............................ G06F 17/30; G06F 17/3061
USPC ......................................................... 704/9, 10
See application file for complete search history.

(56) References Cited

U.S. PATENT DOCUMENTS 7,236,923 B1    6/2007 Gupta
7,536,297 B2    5/2009 Byrd et al.
8,589,370 B2    11/2013 Feng et al.
2003/0014399 A1*    1/2003 Hansen .............. G06F 17/30864
2003/0139921 A1*    7/2003 Byrd .................... G06F 17/2775
704/10

(Continued)

FOREIGN PATENT DOCUMENTS

WO    WO2012/050800 A1    4/2012

OTHER PUBLICATIONS

High, Rob, "The Era of Cognitive Systems: An Inside Look at IBM Watson and How it Works", IBM Corporation, Redbooks, Dec. 12, 2012, 16 pages.

(Continued)

*Primary Examiner* — Michael N Opsasnick
(74) *Attorney, Agent, or Firm* — Francis Lammes; Stephen J. Walder, Jr.; Diana R. Gerhardt

(57) ABSTRACT

Mechanisms are provide for implementing a context aware abbreviation detection and annotation operation. An instance of a full name of an entity is identified in received content and analysis of a context window associated with the instance of the full name of the entity is performed to identify a presence of a pattern of content representative of an abbreviation. An abbreviation is identified as being present in association with the instance of the full name of the entity based on results of the analysis of the context window and a mapping data structure that maps the full name of the entity to the abbreviation is generated. The received content is annotated based on the mapping data structure to thereby generate abbreviation annotations for the received content. The annotated received content is output for use by a cognitive system to perform a cognitive operation based on the annotated received content.

18 Claims, 7 Drawing Sheets

(56) References Cited

U.S. PATENT DOCUMENTS

| | | | |
|---|---|---|---|
| 2006/0248440 A1* | 11/2006 | Rhoads | G06F 17/30728 |
| | | | 715/236 |
| 2008/0208837 A1* | 8/2008 | Wang | G06F 19/28 |
| 2009/0287678 A1 | 11/2009 | Brown et al. | |
| 2009/0299976 A1* | 12/2009 | Dexter | G06F 17/24 |
| 2011/0055233 A1* | 3/2011 | Weber | G06F 17/30625 |
| | | | 707/752 |
| 2011/0066587 A1 | 3/2011 | Ferrucci et al. | |
| 2011/0125734 A1 | 5/2011 | Duboue et al. | |
| 2012/0084076 A1 | 4/2012 | Boguraev et al. | |
| 2013/0007055 A1 | 1/2013 | Brown et al. | |
| 2013/0018652 A1 | 1/2013 | Ferrucci et al. | |
| 2013/0066886 A1 | 3/2013 | Bagchi et al. | |
| 2013/0246047 A1 | 9/2013 | Vassilieva et al. | |

OTHER PUBLICATIONS

McCord, M.C. et al., "Deep parsing in Watson", IBM J. Res. & Dev. vol. 56 No. 3/4 Paper 3, May/Jul. 2012, pp. 3:1-3:15.

Yuan, Michael J. et al., "Watson and Healthcare, How natural language processing and semantic search could revolutionize clinical decision support", IBM Corporation, developerWorks, http://www.ibm.com/developerworks/industry/library/ind-watson/, Apr. 12, 2011, pp. 1-14.

\* cited by examiner 402    406

"In this study, we aimed to investigate whether chronic in vivo treatment of Crataegus microphylla (CM) extract in diabetic rats induced with streptozotocin (STZ, intraperitoneal, 65 mg/kg) preserves vascular function and to evaluate whether the reduction of inducible nitric oxide synthase (iNOS), proinflammatory cytokines, and lipid peroxidation mediates its mechanisms of action. Starting at 4 weeks of diabetes, CM extract (100 mg/kg) was administered to diabetic rats for 4 weeks,...These results suggest that chronic in vivo treatment of CM preserves endothelium-dependent relaxation and vascular contraction in STZ induced diabetes, possibly reducing iNOS expression in the aorta and by decreasing plasma levels..."

"In this study, we aimed to investigate whether chronic in vivo treatment of Crataegus microphylla (CM) extract in diabetic rats induced with streptozotocin (STZ, intraperitoneal, 65 mg/kg) preserves vascular function and to evaluate whether the reduction of inducible nitric oxide synthase (iNOS), proinflammatory cytokines, and lipid peroxidation mediates its mechanisms of action. Starting at 4 weeks of diabetes, CM extract (100 mg/kg) was administered to diabetic rats for 4 weeks,...These results suggest that chronic in vivo treatment of CM preserves endothelium-dependent relaxation and vascular contraction in STZ induced diabetes, possibly reducing iNOS expression in the aorta and by decreasing plasma levels..."

| ABBREVIATIONS OF INTEREST LIST | |
|---|---|
| DEFINITION | ABBR. OF INTEREST |
| CRATAEGUS MICROPHYLLA | CM |
| STREPTOZOTOCIN | STZ |
| INDUCTIBLE NITRIC OXIDE SYNTHASE | INOS |

*FIG. 4C*

GLOBAL ABBREVIATIONS LIST

CM
STZ
INOS
CM
CM
STZ
INOS

450

422  420

"In this study, we aimed to investigate whether chronic in vivo treatment of Crataegus microphylla (*CM*) extract in diabetic rats induced with streptozotocin (*STZ*) intraperitoneal, 65 mg/kg) preserves vascular function and to evaluate whether the reduction of inducible nitric oxide synthase (*iNOS*), proinflammatory cytokines, and lipid peroxidation mediates its mechanisms of action. Starting at 4 weeks of diabetes, CM extract (100 mg/kg) was administered to diabetic rats for 4 weeks,...These results suggest that chronic in vivo treatment of CM preserves endothelium-dependent relaxation and vascular contraction in STZ induced diabetes, possibly reducing iNOS expression in the aorta and by decreasing plasma levels..."

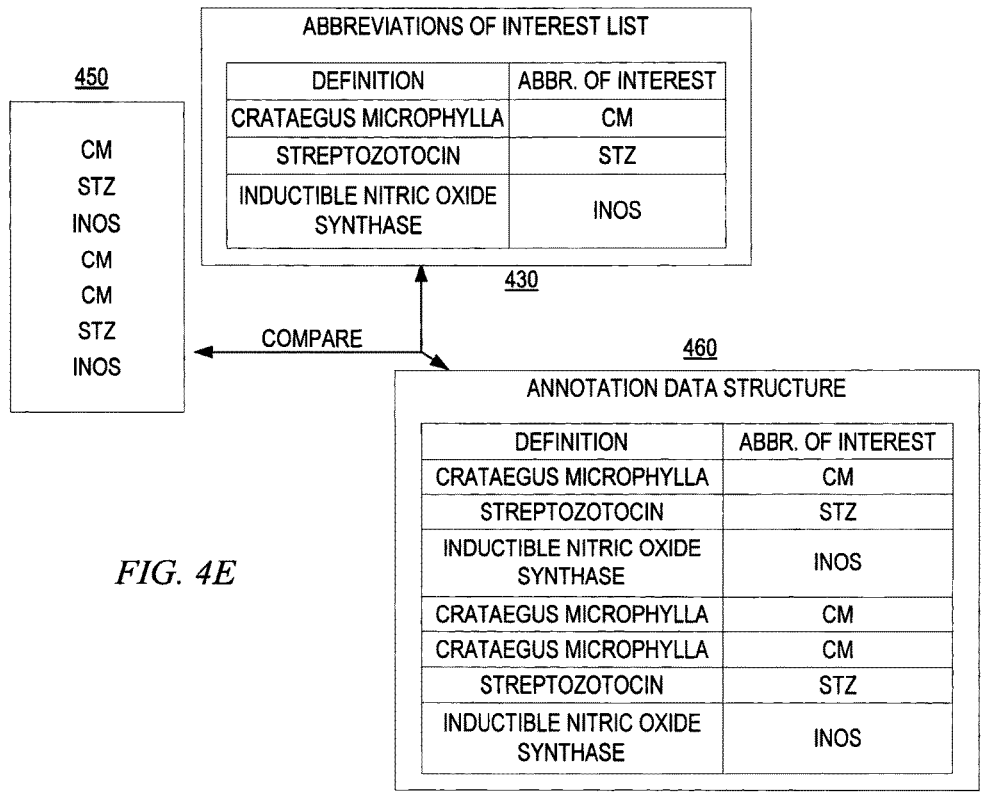

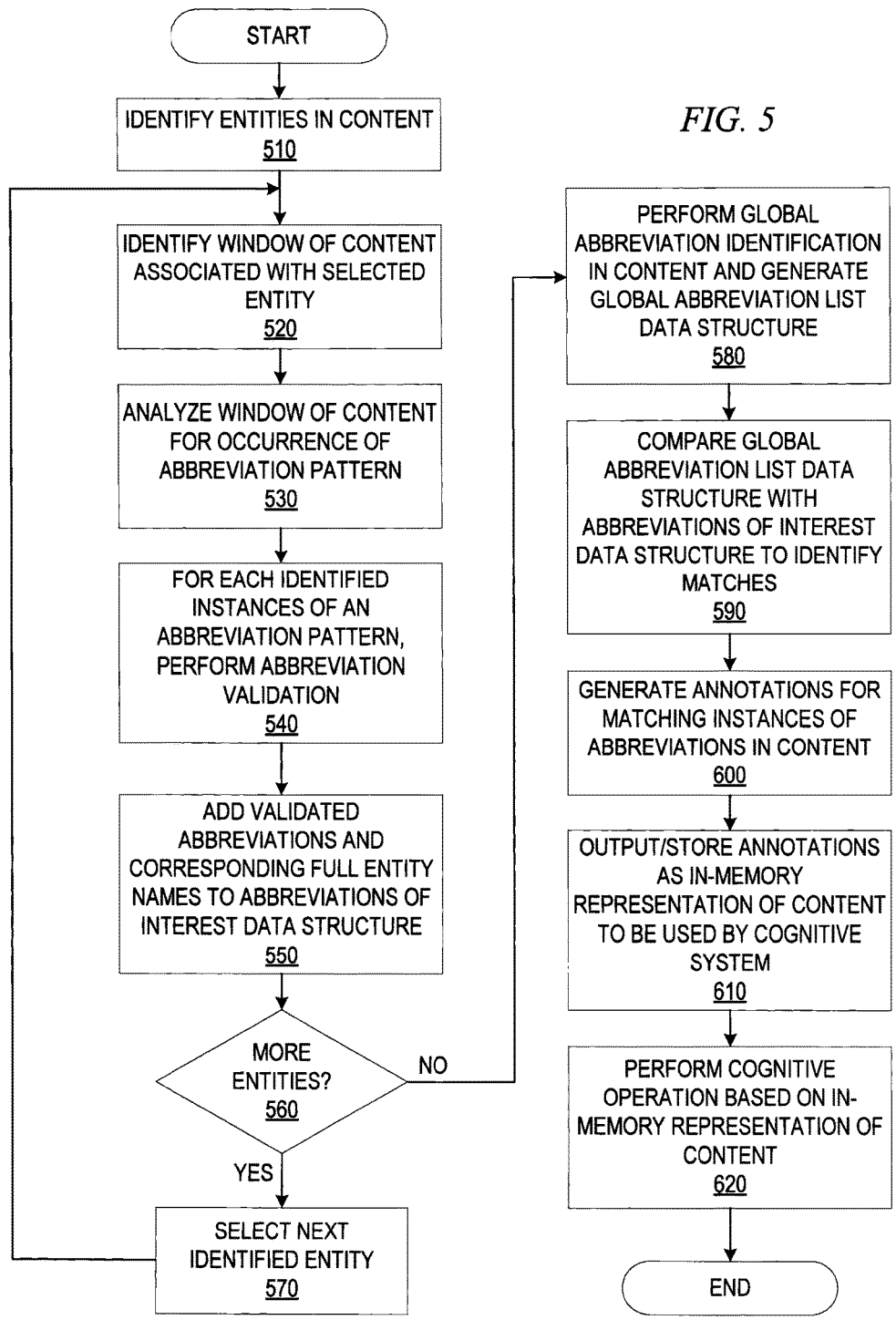

DYNAMIC CONTEXT AWARE ABBREVIATION DETECTION AND ANNOTATION

BACKGROUND

The present application relates generally to an improved data processing apparatus and method and more specifically to mechanisms for dynamic context aware abbreviation detection and annotation.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating various natural language processing (NLP) systems, such as NLP based search engines, Question and Answer (QA) systems, and the like. QA systems take an input question presented in a natural language, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

Examples, of QA systems are Siri® from Apple®, Cortana® from Microsoft®, and question answering pipeline of the IBM Watson™ cognitive system available from International Business Machines (IBM®) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising a processor and a memory having instructions which, when executed by the processor, cause the processor to configure the data processing system to implement a context aware abbreviation detection and annotation (CAADA) system. The method comprises identifying, by the CAADA system, in received content, an instance of a full name of an entity and performing, by the CAADA system, analysis of a context window associated with the instance of the full name of the entity to identify a presence of a pattern of content representative of an abbreviation. The method further comprises identifying, by the CAADA system, an abbreviation being present in association with the instance of the full name of the entity based on results of the analysis of the context window. The method also comprises generating, by the CAADA system, a mapping data structure that maps the full name of the entity to the abbreviation. In addition, the method comprises annotating, by the CAADA system, the received content based on the mapping data structure to thereby generate abbreviation annotations for the received content. Furthermore, the method comprises outputting, by the CAADA system, the annotated received content for use by a cognitive system to perform a cognitive operation based on the annotated received content.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 4A-4F illustrate an example of the operation for identifying abbreviations and annotating them in unstructured content in accordance with one illustrative embodiment; and FIG. 5 is a flowchart outlining an example operation for performing dynamic context aware abbreviation detection and annotation in unstructured content in accordance with one illustrative embodiment.

DETAILED DESCRIPTION

Figure 1:
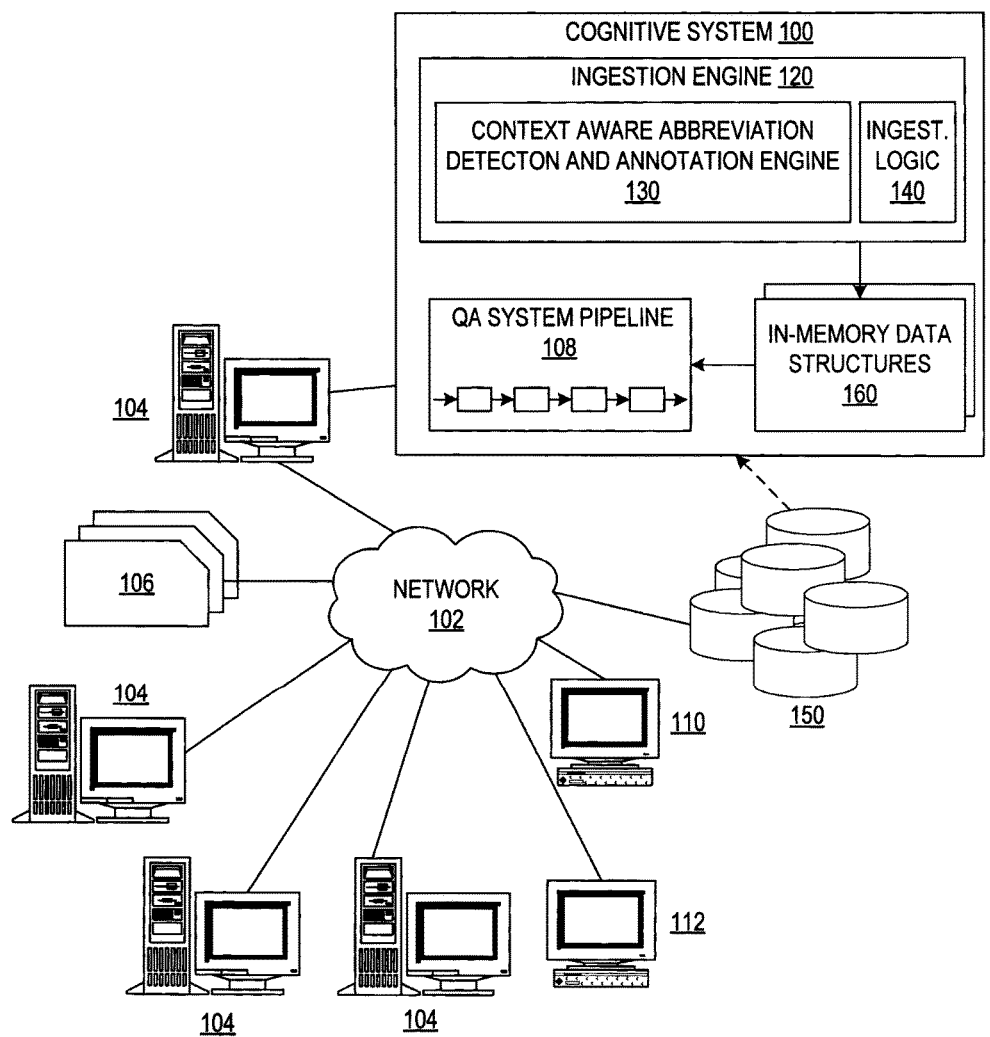
FIG. 1 depicts a schematic diagram of one illustrative embodiment of a question/answer creation (QA) system in a computer network.

In the field of information extraction, such as is performed in many Natural Language Processing (NLP) and Question and Answer (QA) systems, an important task is to identify entities within natural language that are of a particular type. For example, in the medical domain it is important to be able to identify various drugs, symptoms, diseases, and other concepts or entities pertinent to the evaluation of searches, natural language questions, or other requests for information extraction. In order to successfully extract these concepts/entities, it is important to be able to capture both the full names of the concepts/entities (hereafter referred to simply as "entities") and abbreviated forms of the full names. Since the meaning of a particular abbreviation may different between documents, abbreviation cannot unambiguously be extracted independent of the context in which they are utilized.

One solution for capturing both full names and abbreviated forms is to utilize a dictionary of known terms and a set of associated known abbreviations. This solution encounters several issues that make it a sub-optimal solution. First, a single abbreviation can refer to many terms depending on the context in which it is used. For example, the abbreviation "PPS" may refer to post-Polio syndrome in a medical domain, but may also occur frequently as an addendum to letters or emails and refers to "Post Post Script". Thus, an additional layer of contextual understanding becomes necessary to understand the particular usage of the abbreviation within the context.

In addition, another issue is that the string of characters which constitutes an abbreviation can occur in non-abbreviation contexts. For example, the string "aids" may be a common abbreviation of acquired immune deficiency syndrome, but may also occur frequently in various English language documents as a common word, e.g. "John aids Jane with her task." Thus, the occurrence of the string within the context needs to be analyzed at additional layers of contextual evaluation to determine whether the string is in fact an abbreviation or not within the context.

A third issue is that abbreviations must be matched in a case sensitive manner, which distinguishes them from names and associated synonyms, which can occur with varying case sensitivity depending on their position in a sentence, table, etc. For example, the abbreviation "MS" may, in some contexts, refer to the United States of America's state of Mississippi. However, in other contexts, it may denote the disease multiple sclerosis. Furthermore, if the case of the characters is not taken into account, the contraction "Ms", an honorific, or "ms", a lower-case only abbreviation for "milliseconds", may also be mistakenly retrieved and correlated with the state of Mississippi. Thus, abbreviation recognition mechanisms need to provide special handling for abbreviations with regard to case sensitivity analysis.

The illustrative embodiments provide mechanisms for performing dynamic context aware abbreviation detection and annotation in unstructured content, e.g., natural language documents or other natural language content. The mechanisms of the illustrative embodiments perform automatic extraction of abbreviations from natural language (unstructured) textual content, e.g., documents, and automatically associated the abbreviations with the original, non-abbreviated terms. The mechanisms described herein allow the dynamic identification and definition of abbreviations which would otherwise require extraction using pre-defined dictionaries that can be incomplete and ambiguous.

The mechanisms of the illustrative embodiments identify the point at which an abbreviation is defined in a portion of text, e.g., a sentence, paragraph, or the like, by recognizing abbreviation cues within the portion of text. These cues may include, for example, the existence of parentheses and commas immediately following a known term and surrounding a new term. Of course many other patterns of text may be used as abbreviation cues, some of which will be described in greater detail hereafter. The evaluation of abbreviation cues is used to identify candidate abbreviations which are then validated to confirm that they do in fact have properties common to abbreviations and thus, are a likely an abbreviation. Thereafter, equal case mentions of the same string of characters at all other places in the natural language content are extracted, thereby preserving a co-reference to the original full named term for which the abbreviation is defined.

In operation, the mechanisms of the illustrative embodiments parse and analyze the natural language text to identify entities within the natural language text. These entities may be specific to the particular domain in which the mechanisms of the illustrative embodiments are implemented. Thus, for example, in the medical domain, the entities may be various types of drugs, genes, medical conditions, diseases, proteins, and the like. Thus, for example, a database of recognizable entities may be established and used as a basis for identifying instances of these entities in the natural language text being processed, e.g., a listing of drug names, gene names, medical condition names, and/or the like may be generated and used to perform the entity identification through a matching process. Of course, these entity data structures may include synonym data structures or other data structures that map the original entity name to other alternatives to the original entity name.

Having identified an entity within the natural language text, one or more windows of textual content around the entity location in the natural language text are analyzed to identify instances of text matching abbreviation patterns. For example, the 15 textual characters appearing to the right and/or left of the instance of the entity text may be analyzed to determine if a recognizable abbreviation pattern is present. If a portion of text matching an abbreviation pattern is found within the window of text the string of characters associated with the pattern is analyzed to verify that it is in fact an abbreviation. A second set of abbreviation validation patterns may be utilized to determine if the string of characters are in fact an abbreviation. If the validation passes, then the full length name of the entity and its corresponding discovered abbreviation are stored in an "abbreviations of interest" mapping data structure.

The abbreviation patterns and/or abbreviation validation patterns used to identify the abbreviation text associated with an instance of an entity are then used to find all occurrences of abbreviations within the natural language text. This operation is performed so as to find instances of abbreviations that are in the natural language text that are not necessarily associated with identified entities explicitly in the text, e.g., an entity name is associated with an abbreviation typically at a first occurrence of the entity name in a document and then thereafter only the abbreviation is utilized. These identified instances of abbreviations may be included in a global abbreviation list data structure which is then compared against the "abbreviations of interest" mapping data structure to identify the matching instances of the "abbreviations of interest" in the global abbreviation list data structure. Matching abbreviation instances in the global abbreviation list data structure are kept in the annotations data structure for the portion of natural language content.

The mechanisms of the illustrative embodiments may be used as part of an ingestion process when ingesting a plurality of portions of natural language text content. Hereafter, the portions of natural language text content are assumed to be electronic "documents" for simplicity but it should be appreciated that the mechanisms of the illustrative embodiments may be used with any portion of unstructured textual content without departing from the spirit and scope of the illustrative embodiments. During an ingestion process, annotators are executed on the documents to extract features from the documents that may be used to generate an in-memory representation of the documents by creating annotations that identify the features or elements of the natural language text of the documents. The in-memory representation can then be used by natural language processing (NLP) based cognitive systems for performing cognitive operations. For example, a NLP based Question and Answer (QA) cognitive system may utilize the ingested documents to perform searches of the documents for answers to input questions and/or supporting evidence for candidate answers to input questions, as discussed in greater detail hereafter. Thus, the mechanisms of the illustrative embodiments may be implemented in one or more annotators that extract abbreviations and their associated full names, as well as each instance of such abbreviations in the ingested documents, so as to generate annotations and/or other in-memory data structures which are then operated on by a cognitive system to perform a cognitive operation.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
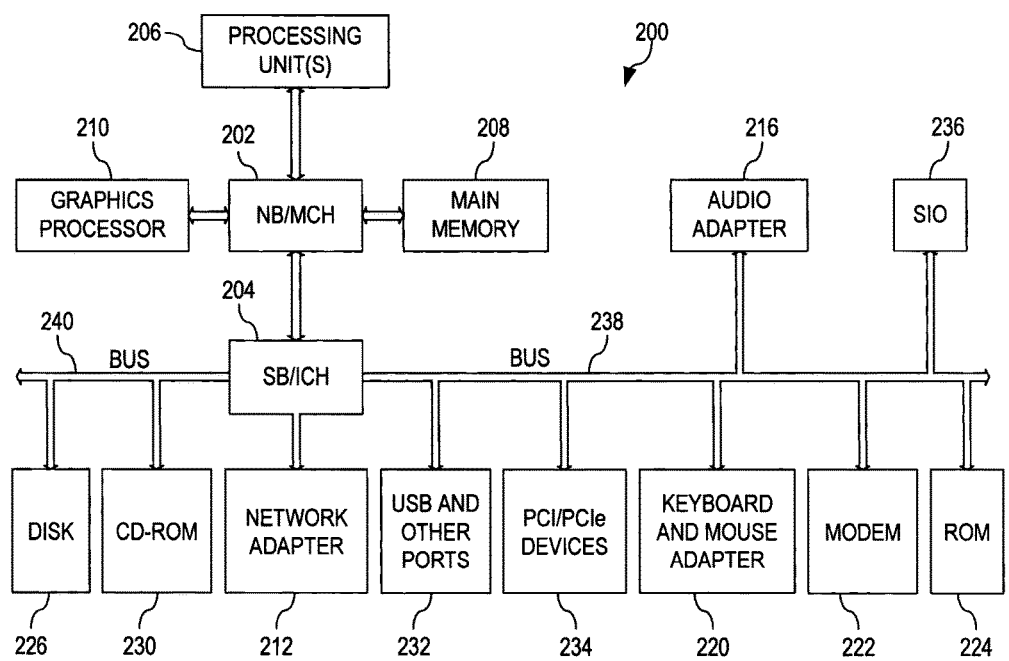
FIG. 2 is a block diagram of an example data processing system in which aspects of the illustrative embodiments are implemented.
Figure 3:
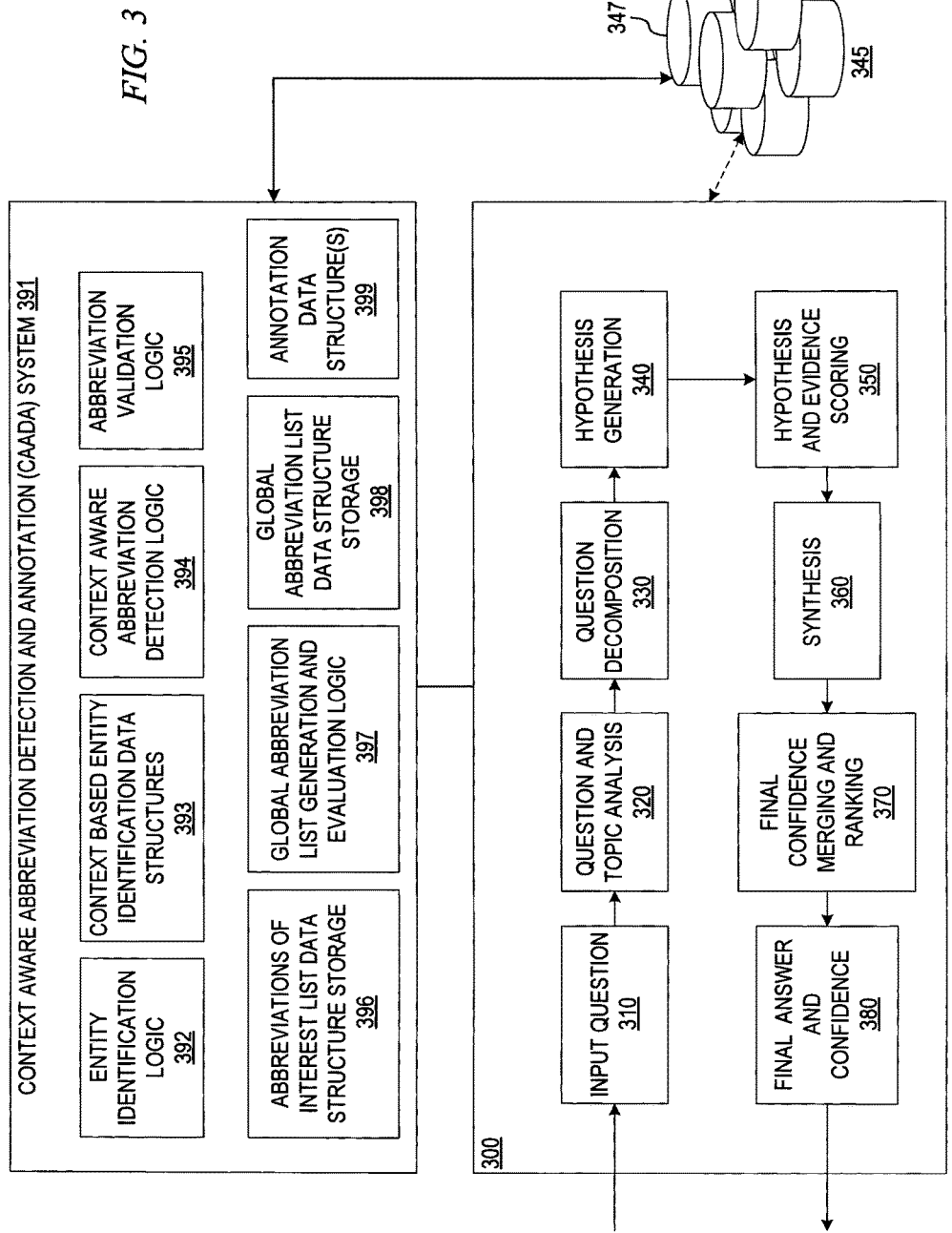
FIG. 3 illustrates a QA system pipeline for processing an input question in accordance with one illustrative embodiment.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example cognitive system implementing a Question Answering (QA) pipeline (also referred to as a Question/Answer pipeline or Question and Answer pipeline), methodology, and computer program product with which the mechanisms of the illustrative embodiments are implemented. As will be discussed in greater detail hereafter, the illustrative embodiments are integrated in, augment, and extend the functionality of these QA mechanisms of the cognitive system with regard to dynamic identification of abbreviations in natural language text. It should be appreciated that while a cognitive system with QA mechanism are described herein, the illustrative embodiments are not limited to such. To the contrary, the illustrative embodiments may be implemented in any cognitive system that operates on unstructured (natural language) or structured text in which abbreviations may be utilized and in which the context of the abbreviation is important.

Since a primary example of the illustrative embodiments is utilized with a cognitive system implementing a QA mechanism, it is important to first have an understanding of how question and answer creation in a cognitive system implementing a QA pipeline is implemented before describing how the mechanisms of the illustrative embodiments are integrated in and augment such QA mechanisms. It should be appreciated that the QA mechanisms described in FIGS. 1-3 are only examples and are not intended to state or imply any limitation with regard to the type of QA mechanisms with which the illustrative embodiments are implemented. Many modifications to the example cognitive system shown in FIGS. 1-3 may be implemented in various embodiments of the present invention without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition. A cognitive system comprises artificial intelligence logic, such as natural language processing (NLP) based logic, for example, and machine learning logic, which may be provided as specialized hardware, software executed on hardware, or any combination of specialized hardware and software executed on hardware. The logic of the cognitive system implements the cognitive operation(s), examples of which include, but are not limited to, question answering, identification of related concepts within different portions of content in a corpus, intelligent search algorithms, such as Internet web page searches, for example, medical diagnostic and treatment recommendations, and other types of recommendation generation, e.g., items of interest to a particular user, potential new contact recommendations, or the like.

IBM Watson™ is an example of one such cognitive system which can process human readable language and identify inferences between text passages with human-like high accuracy at speeds far faster than human beings and on a larger scale. In general, such cognitive systems are able to perform the following functions:

Navigate the complexities of human language and understanding
Ingest and process vast amounts of structured and unstructured data
Generate and evaluate hypothesis
Weigh and evaluate responses that are based only on relevant evidence
Provide situation-specific advice, insights, and guidance
Improve knowledge and learn with each iteration and interaction through machine learning processes
Enable decision making at the point of impact (contextual guidance)
Scale in proportion to the task
Extend and magnify human expertise and cognition
Identify resonating, human-like attributes and traits from natural language
Deduce various language specific or agnostic attributes from natural language
High degree of relevant recollection from data points (images, text, voice) (memorization and recall)
Predict and sense with situational awareness that mimic human cognition based on experiences
Answer questions based on natural language and specific evidence In one aspect, cognitive systems provide mechanisms for answering questions posed to these cognitive systems using a Question Answering pipeline or system (QA system). The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to cognitive system which implements the QA pipeline. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e. candidate answer, is inferred by the question. This process is repeated for each of the candidate answers until the QA pipeline identifies candidate answers that surface as being significantly stronger than others and thus, generates a final answer, or ranked set of answers, for the input question.

As mentioned above, QA pipeline and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA pipeline to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA pipeline. Content creators, automated tools, or the like, annotate or otherwise generate metadata for providing information useable by the QA pipeline to identify these question and answer attributes of the content.

Operating on such content, the QA pipeline generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a cognitive system 100 implementing a question answering (QA) pipeline 108 in a computer network 102. One example of a question/answer generation operation which may be used in conjunction with the principles described herein is described in U.S. Patent Application Publication No. 2011/0125734, which is herein incorporated by reference in its entirety. The cognitive system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The cognitive system 100 and network 102 enables question/answer (QA) generation functionality for one or more cognitive system users via their respective computing devices 110-112. Other embodiments of the cognitive system 100 may be used with components, systems, subsystems, and/or devices other than those that are depicted herein.

The cognitive system 100 is configured to implement a QA pipeline 108 that receive inputs from various sources. For example, the cognitive system 100 receives input from the network 102, a corpus of electronic documents 106, cognitive system users, and/or other data and other possible sources of input. In one embodiment, some or all of the inputs to the cognitive system 100 are routed through the network 102. The various computing devices 104 on the network 102 include access points for content creators and QA system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the content creator creates content in a document of the corpus of data 106 for use as part of a corpus of data with the cognitive system 100. The document includes any file, text, article, or source of data for use in the cognitive system 100. QA system users access the cognitive system 100 via a network connection or an Internet connection to the network 102, and input questions to the cognitive system 100 that are answered by the content in the corpus of data 106. In one embodiment, the questions are formed using natural language. The cognitive system 100 parses and interprets the question via a QA pipeline 108, and provides a response to the cognitive system user, e.g., cognitive system user 110, containing one or more answers to the question. In some embodiments, the cognitive system 100 provides a response to users in a ranked list of candidate answers while in other illustrative embodiments, the cognitive system 100 provides a single final answer or a combination of a final answer and ranked listing of other candidate answers.

The cognitive system 100 implements the QA pipeline 108 which comprises a plurality of stages for processing an input question and the corpus of data 106. The QA pipeline 108 generates answers for the input question based on the processing of the input question and the corpus of data 106. The QA pipeline 108 will be described in greater detail hereafter with regard to FIG. 3.

In some illustrative embodiments, the cognitive system 100 may be the IBM Watson™ cognitive system available from International Business Machines Corporation of Armonk, N.Y., which is augmented with the mechanisms of the illustrative embodiments described hereafter. As outlined previously, a QA pipeline of the IBM Watson™ cognitive system receives an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The QA pipeline of the IBM Watson™ cognitive system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the QA pipeline of the IBM Watson™ cognitive system has regarding the evidence that the potential response, i.e. candidate answer, is inferred by the question. This process is be repeated for each of the candidate answers to generate ranked listing of candidate answers which may then be presented to the user that submitted the input question, or from which a final answer is selected and presented to the user. More information about the QA pipeline of the IBM Watson™ cognitive system may be obtained, for example, from the IBM Corporation website, IBM Redbooks, and the like. For example, information about the QA pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As shown in FIG. 1, the cognitive system 100 is further augmented, in accordance with the mechanisms of the illustrative embodiments, to include logic implemented in specialized hardware, software executed on hardware, or any combination of specialized hardware and software executed on hardware, for implementing an ingestion engine 120 that comprises a context aware abbreviation detection and annotation (CAADA) system 130. The CAADA system 130 operates in conjunction with other ingestion logic 140 that performs other generally known or later developed operations for ingesting structured and unstructured, e.g., natural language, content from one or more corpora of content 150. The ingestion engine 120 may output one or more in-memory data structures 160 for use by the cognitive system 100 when performing its cognitive operations, such as generating answers to input natural language questions via the QA system pipeline 108, for example. The in-memory data structures 160 may comprise, in accordance with the illustrative embodiments, one or more annotation data structures identifying abbreviations within one or more ingested portions of natural language content from the corpora 150.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which implements a cognitive system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline, of a cognitive system, for processing an input question in accordance with one illustrative embodiment. The QA system pipeline of FIG. 3 may be implemented, for example, as QA pipeline 108 of cognitive system 100 in FIG. 1. It should be appreciated that the stages of the QA pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA pipeline 300 comprises a plurality of stages 310-380 through which the cognitive system operates to analyze an input question and generate a final response. In an initial question input stage 310, the QA pipeline 300 receives an input question that is presented in a natural language format. That is, a user inputs, via a user interface, an input question for which the user wishes to obtain an answer, e.g., "Who are Washington's closest advisors?" In response to receiving the input question, the next stage of the QA pipeline 300, i.e. the question and topic analysis stage 320, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500 s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 3, the identified major features are then used during the question decomposition stage 330 to decompose the question into one or more queries that are applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries are applied to one or more databases storing information about the electronic texts, documents, articles, websites, and the like, that make up the corpus of data/information, e.g., the corpus of data 106 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA pipeline 300, in stage 350, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 360, the large number of scores generated by the various reasoning algorithms are synthesized into confidence scores or confidence measures for the various hypotheses. This process involves applying weights to the various scores, where the weights have been determined through training of the statistical model employed by the QA pipeline 300 and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA pipeline 300 that identifies a manner by which these scores may be combined to generate a confidence score or measure for the individual hypotheses or candidate answers. This confidence score or measure summarizes the level of confidence that the QA pipeline 300 has about the evidence that the candidate answer is inferred by the input question, i.e. that the candidate answer is the correct answer for the input question.

The resulting confidence scores or measures are processed by a final confidence merging and ranking stage 370 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question via a graphical user interface or other mechanism for outputting information.

As shown in FIG. 3, in accordance with the illustrative embodiments, the QA system pipeline 300, when operating on the corpus/corpora 345, 347 in actuality operates on an ingested representation of the documents or other content present within the corpus/corpora 345, 347 which is stored as a set of in-memory data structures 399. An ingestion engine 390 operates to ingest the corpus/corpora 345, 347 prior to the operation of the QA system pipeline 300 on the corpus/corpora 345, 347 so as to generate this set of in-memory data structures 399. As part of the ingestion operation, in accordance with the illustrative embodiments, the ingestion engine 390 processes the natural language text data of content (e.g., documents) in the corpus/corpora 345, 347 to identify instances of abbreviations and correlate those abbreviations to their context sensitive full names. In order to perform such operations, in addition to other generally known ingestion logic implemented by the ingestion engine 390, the ingestion engine 390 implements a context aware abbreviation detection and annotation (CAADA) system 391.

The CAADA system 391 may be implemented as part of an annotator that operates on input natural language text content for example. There may be multiple annotators for annotating natural language text content in many different ways. For example, in a medical domain, a first annotator may annotate instances of drug names within a portion of natural language text content, a second annotator may annotate instances of genes mentioned in natural language text content, a third annotator may annotate medical conditions mentioned in natural language text content, and so on. Each annotator may have its own instances of the CAADA system 391. In other illustrative embodiments, there may be a single CAADA system 391 in which each of the separate annotators operate to identify entities within natural language text content and with which the CAADA system 391 operates to identify abbreviation instances associated with the entities identified by the annotators. Any suitable configuration of the annotators and CAADA system 391 may be implemented without departing from the spirit and scope of the present invention.

The CAADA system 391 comprises entity identification logic 392, context based entity identification data structures 393, context aware abbreviation detection logic 394, abbreviation validation logic 395, abbreviations of interest list data structure storage 396, global abbreviation list generation and evaluation logic 397, and global abbreviation list data structure storage 398. The CAADA system 391 may output annotation data structure 399 as part of an in-memory representation of a portion of content ingested by the ingestion engine 390 and utilized by the QA system pipeline 300 when performing its question answering operations. It should be appreciated that the individual logic elements of the CAADA system 391, and/or the CAADA system 391 as a whole, may be implemented as software instructions loaded into memory and executed by one or more processors of one or more data processing systems, may be implemented as hardware logic comprising circuits, integrated circuit elements (such as Application Specific Integrated Circuits (ASICs)), or the like, or may be implemented as a combination of executed software instructions and hardware logic, without departing from the spirit and scope of the present invention.

The entity identification logic 392 is configured to identify entities within unstructured content, such as natural language documents. The entities that are identified by the entity identification logic 392 may be specific to particular domains. In the case of a domain specific identification of entities, an identification of the domain(s) to be implicit in the annotator that is implementing the CAADA system, e.g., an annotator for medical drugs will utilize a specific medical drug domain and corresponding data structures, or may be specified through metadata associated with a corpus of information being processed, specified by a user, or any other known or later developed mechanism for specifying the domain(s) to be utilized and then correlating the specified domain(s) with corresponding domain specific database.

The entity identification logic 392 may utilize context based entity identification data structures 393 to identify the entities. There may be different context based entity identification data structures 393 for each of a plurality of different domains upon which the QA system pipeline 300 operates with the corresponding data structure 393 being selected for use based on the specified or implicit domain identification. These context based entity identification data structures 393 may comprise character string patterns or other content patterns, e.g., audible data patterns, video or image data patterns, or the like, against which patterns within unstructured content being process may be compared to determine matches which are indicative of an identified entity. For example, the context based entity identification data structures 393 may comprise a listing of entity names which are character strings indicative of an entity. Character strings within the unstructured content being processed may be compared against these entity names to determine if there is a match, in which case an entity has been identified within the unstructured content.

The entity identification logic 392 identifies the entities within the unstructured content of the corpus being processed and provides the identified entities to the context aware abbreviation detection logic 394. For example, in a medical domain, the entity identification logic 392 may identify different types of drugs, proteins, medical conditions, etc. Each instance of a full name of one of these entities is identified in the portion of content being processed and indicated to the context aware abbreviation detection logic 394 which defines a window of content associated with each instance, e.g., a number of characters before and/or after the instance of the full name of the entity. For example, various abbreviation patterns specifying specific patterns of tokens indicative of potential abbreviations may be established and used to configure the context aware abbreviation detection logic 394.

In one illustrative embodiment, the window of content comprises a right context window, i.e. a window of X number of characters to the right of the identified full name of the entity. Analyzing the right context window, patterns of tokens indicative of potential abbreviations may comprises opening parenthesis followed by a closing parenthesis "(_____)", an opening parenthesis followed by a comma "(_____,", a comma and white space followed by a comma ",_____,", or the like. Any suitable pattern of tokens may be utilized to define a potential abbreviation pattern used by the context aware abbreviation detection logic 394 to detect potential occurrences of abbreviations associated with instances of full names of entities without departing from the spirit and scope of the illustrative embodiments.

If the context of the window associated with an instance of a full name of an entity contains a recognized pattern of a potential abbreviation, then the character string associated with the identified instance of the pattern of a potential abbreviation, i.e. the abbreviation pattern, is analyzed to validate that the string is in fact an abbreviation. In order to perform such validation, the abbreviation validation logic 395 applies abbreviation validation patterns to the character string associated with the instance of the abbreviation pattern to determine if there is a match to any of the abbreviation validation patterns. If there is a match, then the potential abbreviation is considered an actual abbreviation and is added to the abbreviations of interest list data structures storage 396. If there is not a match, then the potential abbreviation is discarded as not being an actual validated abbreviation.

Examples of abbreviation validation patterns may include, for example, a capital letter followed by zero to eight alphabetical, numerical, period, hyphen characters, or other symbols, ending with an alphabetical or numerical character. Another possible abbreviation validation pattern may be a lower case letter or number from one to nine followed by zero to three alphabetical, numerical, period, hyphen characters, and then followed by the previously described abbreviation validation pattern. Many other possible abbreviation validation patterns may be used without departing from the spirit and scope of the present invention. It should be appreciated that both the abbreviation patterns and abbreviation validation patterns may be generic in nature (applicable across a plurality of domains) and/or domain specific in nature. Thus, patterns for a first domain may be different from patterns established for a second domain, depending on the desired implementation.

The operations described above may be performed for each instance of a full name corresponding to an identified entity found in the portion of content being processed, e.g., an electronic document, portion of an electronic document, web page, article, journal entry, or the like. In this way, the abbreviations of interest list data structure storage 396 is populated with instances of validated abbreviations and their corresponding full names of corresponding entities. Thus, a mapping between a validated abbreviation and the full name is dynamically generated by analysis of the portion of content.

The global abbreviation list generation and evaluation logic 397, in response to completing processing of the portion of content by the context aware abbreviation detection logic 394 and abbreviation validation logic 395, analyzes the entirety of the portion of content based on the abbreviation patterns and abbreviation validation patterns to identify additional instances of abbreviations throughout the portion of content. It should be appreciated that this identification of instances of abbreviations is not tied to the identification of instances of full names of entities. For example, this global analysis of the portion of content finds other instances of abbreviations within the portion of content that are not necessarily tied to any full name of an entity. The global abbreviation list generation and evaluation logic 397 compiles a global abbreviation list data structure in the store 398 for use in comparing with the abbreviations of interest list data structure 396. Matches between the abbreviation of interest list data structure and the global abbreviation list data structure 398 are stored as part of the annotation data structures 399 that are used by the QA system pipeline 300 to perform its operations on the corpus/corpora 345, 347 to generate candidate answers and/or a final answer to the input question 310. The matches are essentially each instance of the abbreviations of interest within the portion of content. Other abbreviations found within the portion of content that do not match the abbreviations if interest 396 are discarded and not utilized in the annotation data structures 399.

Thus, the illustrative embodiments provide mechanisms for dynamically identifying instances of abbreviations as well as their mappings to full names of entities within the context of the content. The illustrative embodiments take into account windows of content surrounding context based identification of entities. The illustrative embodiments are not based on a rigid pre-defined set of abbreviations but provides mechanisms for learning abbreviations based on pattern matching for matching patterns indicative of abbreviations and then analyzing the content of the potential abbreviations to validate them as actual abbreviations.

FIGS. 4A-4F illustrate an example operation of one illustrative embodiment with regard to an example portion of natural language content. As shown in FIG. 4A, as part of the operation of the entity identification logic 392, instances of full names of entities recognizable by the entity identification logic 392 are identified. In the depicted example, 402 and 404 are instances of drugs with 406 and 408 being the right context windows associated with the two instances of drugs 402 and 404. Similarly, 410 is an identified instance of a protein in the depicted example, with element 412 representing the right context window associated with the instance of the protein 410. In the depicted example, the right context window comprises the 12 characters following the instance of the full name of the entity.

The context aware abbreviation logic 394 analyzes each of the context windows 406, 408, and 412 to determine if there are instances of patterns indicative of a potential abbreviation being present. In the context window 406, for example, the abbreviation pattern "(_____)" is identified. In the context window 408, the abbreviation pattern "(_____," is identified. In the context window 412, the abbreviation pattern "(_____)" is identified. Thus, each of the context windows 406, 408, 412 contain potential abbreviations in the depicted example.

Moving to FIG. 4B, the character strings associated with the identified abbreviation patterns are then analyzed by the abbreviation validation logic 395 to determine if they match any of the abbreviation validation patterns. Thus, for example, the strings "CM" in 420, "STZ" in 422, and "iNOS" in 424 are compared against abbreviation validation patterns that indicate whether the string is a valid abbreviation or not. In the depicted example, each of the strings match abbreviation validation patterns, e.g., capital letter followed by zero to eight alphabetical, numerical, period, or hyphen characters, and ending with an alphabetical or numerical character and a lower case letter or digit from one to nine followed by zero to three alphabetical, numerical, period, or hyphen characters followed by the previous pattern.

In response to the potential abbreviations being validated as actual abbreviations, the abbreviation and its corresponding full name entity instance are added to the abbreviations of interest list data structure, such as shown in FIG. 4C as data structure 430. In addition, a global analysis of the portion of content is performed to identify other instances within the content that match the abbreviation patterns and abbreviation validation patterns. Similar mechanisms as described above may be employed by the global abbreviation list generation and evaluation logic 397 to generate the global abbreviation list data structure 450 in FIG. 4D for example. As shown in FIG. 4D, instances of abbreviations 440-446, other than 420-424 found through the previous operations, are identified through the global analysis of the portion of content. The identified instances of abbreviations are added to the global abbreviation list 450.

The global abbreviation list 450 is then compared to the abbreviations of interest list 430, as shown in FIG. 4E to thereby identify entries in the global abbreviation list 450 that match entries in the abbreviations of interest list 430. In the depicted example, all of the instances in the global abbreviation list 450 match entries in the abbreviations of interest list 430, however it should be appreciated that this is not required and in many cases there may be abbreviations in the global abbreviations list 450 that do not appear in the abbreviations of interest list 430 and thus, are discarded.

The instances of the abbreviations in the global abbreviation list data structure 450 that match entries in the abbreviations of interest list 430 are used to generate annotations in an annotation data structure 460 for the instances of the abbreviations in the portion of content. In the depicted example, as shown in FIG. 4E, annotations are generated for the abbreviation instances 420-424 and 440-446 and stored in the annotations data structure 460. The annotations may be considered to be the rows in the annotation data structure 460, with individual instances of the annotations being indicated by pointers in the annotation data structure (not shown). Thus, an annotation, in the depicted example, may comprise the full text expanded term, the abbreviation, and one or more pointers to instances of the abbreviation in the portion of content. The annotated portion of content is shown in FIG. 4F where each instance of an abbreviation 420-424 and 440-446 are linked to an annotation in the annotation data structure 460. These annotations, either alone or in combination with other annotations generated for the portion of content, are used to generate an in-memory representation of the portion of content which is output or otherwise utilized by the QA system pipeline 300 when answering natural language input questions.

FIG. 5 is a flowchart outlining an example operation for performing dynamic context aware abbreviation detection and annotation in unstructured content in accordance with one illustrative embodiment. As shown in FIG. 5, the operation starts with the identification of entities in the portion of content (step 510). As noted above, this identification of entities may be based on a general or domain specific database of recognizable entities. In the case of a domain specific database, an identification of the domain(s) to be used may be specified through metadata associated with a corpus of information being processed, specified by a user, or any other known or later developed mechanism for specifying the domain(s) to be utilized and then correlating the specified domain(s) with corresponding domain specific database.

For a next selected instance of an entity identified in the content, a window of content, i.e. a context window, is identified in association with the selected instance of the entity (step 520). The context window is analyzed for an occurrence of an abbreviation pattern (step 530). For each identified instance of an abbreviation pattern in the context window, an abbreviation validation operation is performed to validate the instance as an actual abbreviation (step 540). Validated abbreviations are added along with corresponding full entity names to an abbreviations of interest data structure (step 550).

A determination is made as to whether there are more instances of identified entities that need to be analyzed with regard to their context windows (step 560). If so, the operation selects a next instance of an identified entity (step 570) and returns to step 520 where the operations are repeated for the newly selected instance of the entity. If there are no more instances of entities to be processed, a global abbreviation identification operation is performed on the content and the global abbreviation list data structure is generated (step 580). The global abbreviation list data structure is compared to the abbreviations of interest data structure to identify matches (step 590) Annotations for the matching instances in the global abbreviation list data structure and abbreviations of interest data structure are generated (step 600). The annotations are output/stored as an in-memory representation of the content to be used by a cognitive system (step 610). Cognitive operations are then performed based on the in-memory representation of content (step 620). The operation then terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory having instructions which, when executed by the processor, cause the processor to configure the data processing system to implement a context aware abbreviation detection and annotation (CAADA) system, the method comprising:

identifying, by the CAADA system, in received content, an instance of a full name of an entity;

performing, by the CAADA system, analysis of a context window associated with the instance of the full name of the entity to identify a presence of a pattern of content representative of an abbreviation;

identifying, by the CAADA system, an abbreviation being present in association with the instance of the full name of the entity based on results of the analysis of the context window;

generating, by the CAADA system, a mapping data structure that maps the full name of the entity to the abbreviation;

analyzing, by the CAADA system, the received content to identify other instances of the abbreviation that match the abbreviation and the pattern of content representative of the abbreviation;

generating, by the CAADA system, a global abbreviation list data structure comprising each instance of the abbreviation within the received content;

comparing, by the CAADA system, the abbreviation in the mapping data structure to the abbreviation in the global abbreviation list data structure to identify matches between entries in the mapping data structure to entries in the global abbreviations list data structure;

responsive to matching an abbreviation in the global abbreviation list data structure to an abbreviation in the mapping data structure, generating, by the CAADA system, annotations in an annotation data structure for each instance of the abbreviation in received content along with the full name of the entity associated with the abbreviation;

annotating, by the CAADA system, the received content based on the annotation data structure to thereby generate abbreviation annotations for each instance of the abbreviation in the received content; and outputting, by the CAADA system, the annotated received content along with the annotation data structure for use by a cognitive system to perform a cognitive operation based on the annotated received content and the annotation data structure.

2. The method of claim 1, wherein identifying an instance of a full name of an entity comprises parsing the content to identify matching text strings that match text associated with entities in a database of recognizable entities.

3. The method of claim 2, wherein the database of recognizable entities is a domain specific database that stores information for recognizable entities specific to the domain.

4. The method of claim 3, wherein the database of recognizable entities is one of a plurality of databases of recognizable entities, each database in the plurality of databases being associated with a different domain, and wherein the database of recognizable entities is selected from the plurality of databases based on a specification of a domain of interest.

5. The method of claim 1, wherein identifying an abbreviation being present in association with the instance of the full name of the entity further comprises:

identifying, within the context window, an abbreviation cue instance being present, wherein the abbreviation cue instance is an instance of one or more previously defined abbreviation cues, and wherein the abbreviation cue instance is associated with a candidate abbreviation; and validating, by the CAADA system, the candidate abbreviation as representing an actual abbreviation present in the context window.

6. The method of claim 5, wherein validating the candidate abbreviation as representing an actual abbreviation comprises:
applying, by the CAADA system, one or more abbreviation validation patterns to a string of characters of the candidate abbreviation; and
validating, by the CAADA system, the candidate abbreviation as representing an actual abbreviation in response to the candidate abbreviation matching at least one of the one or more abbreviation validation patterns.

7. The method of claim 1, wherein the annotated received content comprises the received content and a corresponding in-memory annotation data structure that stores annotations corresponding to the received content, wherein the annotations in the annotation data structure comprise the abbreviation annotations.

8. The method of claim 1, wherein the method is performed as part of an ingestion operation for ingesting a corpus of information upon which a natural language processing operation is performed by a natural language processing system, wherein the received content is a portion of the corpus of information.

9. The method of claim 8, wherein the natural language processing operation is a question and answer operation, and wherein the natural language processing system is a Question and Answer (QA) system.

10. A computer program product comprising a non-transitory computer readable storage medium having a computer readable program stored therein, wherein the computer readable program, when executed on a computing device, causes the computing device to implement a context aware abbreviation detection and annotation (CAADA) system that operates to:
identify, in received content, an instance of a full name of an entity;
perform analysis of a context window associated with the instance of the full name of the entity to identify a presence of a pattern of content representative of an abbreviation;
identify an abbreviation being present in association with the instance of the full name of the entity based on results of the analysis of the context window;
generate a mapping data structure that maps the full name of the entity to the abbreviation;
analyze the received content to identify other instances of the abbreviation that match the abbreviation and the pattern of content representative of the abbreviation;
generate a global abbreviation list data structure comprising each instance of the abbreviation within the received content;
compare the abbreviation in the mapping data structure to the abbreviation in the global abbreviation list data structure to identify matches between entries in the mapping data structure to entries in the global abbreviations list data structure;
responsive to matching an abbreviation in the global abbreviation list-data structure to an abbreviation in the mapping data structure, generate annotations in an annotation data structure for each instance of the abbreviation in received content along with the full name of the entity associated with the abbreviation;
annotate the received content based on the annotation data structure to thereby generate abbreviation annotations for each instance of the abbreviation in the received content; and
output the annotated received content along with the annotation data structure for use by a cognitive system to perform a cognitive operation based on the annotated received content and the annotation data structure.

11. The computer program product of claim 10, wherein identifying an instance of a full name of an entity comprises parsing the content to identify matching text strings that match text associated with entities in a database of recognizable entities.

12. The computer program product of claim 11, wherein the database of recognizable entities is a domain specific database that stores information for recognizable entities specific to the domain.

13. The computer program product of claim 12, wherein the database of recognizable entities is one of a plurality of databases of recognizable entities, each database in the plurality of databases being associated with a different domain, and wherein the database of recognizable entities is selected from the plurality of databases based on a specification of a domain of interest.

14. The computer program product of claim 10, wherein identifying an abbreviation being present in association with the instance of the full name of the entity further comprises:
identifying, within the context window, an abbreviation cue instance being present, wherein the abbreviation cue instance is an instance of one or more previously defined abbreviation cues, and wherein the abbreviation cue instance is associated with a candidate abbreviation; and
validating the candidate abbreviation as representing an actual abbreviation present in the context window.

15. The computer program product of claim 14, wherein validating the candidate abbreviation as representing an actual abbreviation comprises:
applying one or more abbreviation validation patterns to a string of characters of the candidate abbreviation; and
validating the candidate abbreviation as representing an actual abbreviation in response to the candidate abbreviation matching at least one of the one or more abbreviation validation patterns.

16. The computer program product of claim 10, wherein the annotated received content comprises the received content and a corresponding in-memory annotation data structure that stores annotations corresponding to the received content, wherein the annotations in the annotation data structure comprise the abbreviation annotations.

17. The computer program product of claim 10, wherein the CAADA system performs the operation as part of an ingestion operation for ingesting a corpus of information upon which a natural language processing operation is performed by a natural language processing system, wherein the received content is a portion of the corpus of information.

18. An apparatus comprising:
a processor; and
a memory coupled to the processor, wherein the memory comprises instructions which, when executed by the processor, cause the processor to implement a context aware abbreviation detection and annotation (CAADA) system that operates to:
identify, in received content, an instance of a full name of an entity;
perform analysis of a context window associated with the instance of the full name of the entity to identify a presence of a pattern of content representative of an abbreviation;
identify an abbreviation being present in association with the instance of the full name of the entity based on results of the analysis of the context window;

generate a mapping data structure that maps the full name of the entity to the abbreviation;
analyze the received content to identify other instances of the abbreviation that match the abbreviation and the pattern of content representative of the abbreviation;
generate a global abbreviation list data structure comprising each instance of the abbreviation within the received content;
compare the abbreviation in the mapping data structure to the abbreviation in the global abbreviation list data structure to identify matches between entries in the mapping data structure to entries in the global abbreviations list data structure;
responsive to matching an abbreviation in the global abbreviation list data structure to an abbreviation in the mapping data structure, generate annotations in an annotation data structure for each instance of the abbreviation in received content along with the full name of the entity associated with the abbreviation;
annotate the received content based on the annotation data structure to thereby generate abbreviation annotations for each instance of the abbreviation in the received content; and
output the annotated received content along with the annotation data structure for use by a cognitive system to perform a cognitive operation based on the annotated received content and the annotation data structure.

* * * * *